United States Patent [19]

Richards

[11] 3,782,179

[45] Jan. 1, 1974

[54] TEMPERATURE AND SALINITY COMPENSATION FOR SOIL WATER SENSITIVE RESISTORS

[76] Inventor: Lorenzo A. Richards, 4455 Fifth St., Riverside, Calif. 92501

[22] Filed: Sept. 4, 1970

[21] Appl. No.: 69,717

Related U.S. Application Data

[63] Continuation-in-part of Ser. No. 763,218, Sept. 27, 1968, abandoned.

[52] U.S. Cl. .................................................. 73/73
[51] Int. Cl. ........................................... G01n 13/00
[58] Field of Search .................. 73/73, 27; 239/63; 324/65 M; 323/75; 338/34

[56] References Cited
UNITED STATES PATENTS

| | | | |
|---|---|---|---|
| 3,517,549 | 6/1970 | Teich | 73/73 |
| 2,768,069 | 10/1956 | Thompson | 73/27 X |
| 2,869,359 | 1/1959 | Offermann | 73/73 |
| 3,181,098 | 4/1965 | Richards | 338/34 |
| 3,182,914 | 5/1965 | Hosier | 239/63 |

OTHER PUBLICATIONS

Holister, "Experimental Stress Analysis," 1967 pages 95, 98, 99, 100, Library of Congress Cat. No. 67-10159.

*Primary Examiner*—James J. Gill
*Attorney*—Herbert E. Kidder

[57] ABSTRACT

Relative wetness (matric suction) of soil is measured by two water-sensitive resistors buried closely adjacent one another, where they are similarly exposed to matric suction, salinity and temperature of the soil. Each resistor incorporates a layer of specially-selected granular fill material compressed between appropriate electrodes, which are connected to an electrical circuit for measuring the ratio of the two resistances. The pore structure of the fill material is more or less filled with soil solution at the same temperature, salinity and matric suction as the solution in the adjacent soil. The fill material of one unit is relatively fine, and that of the other is relatively coarse. The different particle size causes one unit to have a greater change in the amount of soil solution held by the fill material for a given change of matric suction, than the other, with a correspondingly greater resistance change. Both units have the same fractional resistance change for any given change in temperature and/or salinity of the soil solution, and the ratio of the resistance of the two units is therefore translated by the said circuit into terms of matric suction, free from adverse temperature and salinity effects.

5 Claims, 13 Drawing Figures

PATENTED JAN 1 1974

INVENTOR
LORENZO A. RICHARDS
BY
*Herbert E. Kidder*
AGENT

INVENTOR.
LORENZO A. RICHARDS
BY Herbert E. Kidder
AGENT

TEMPERATURE AND SALINITY COMPENSATION FOR SOIL WATER SENSITIVE RESISTORS

CROSS-REFERENCE TO RELATED APPLICATIONS:

This application is a continuation-in-part of my pending application, Ser. No. 763,218, filed Sept. 27, 1968, now abandoned.

BACKGROUND OF THE INVENTION:

Measurements of the physical condition of concentration of water in soils and other porous media are useful for agricultural, engineering and other purposes. U.S.Patent Classification Divisions 338–34, 338–35, 340–235, and 284 contain material related to this subject.

U.S.Pat. Application Ser. No. 657,293 filed July 31, 1967 by L.A.Richards reviews the current terminology and nomenclature used by soil physicists in describing and measuring soil-water energy status, and thus relates to the present application. U.S. Pat. No. 3,181,098 (Cl. 338–34) by Richards discloses improved water sensitive resistors for measuring soil matric suction and these resistors are used directly in the present application.

The ratio of the alternating current (a.c.) resistance $R_S$ and $R_C$ of two water-sensitive resistors that are adjacently disposed in soil will be responsive to matric suction if the rate of change of $R_S$ with respect to matric suction is greater than the rate of change of $R_C$ with respect to matric suction. Being adjacent, changes in soil temperature and salinity are the same for both and with proper construction these variables can be made to have the same fractional effect on $R_S$ and $R_C$. The ratio $R_S/R_C$, as measured in a Wheatstone bridge sensing circuit can thus be made essentially independent of unwanted temperature and salinity effects by using $R_C$ as a compensator for $R_S$.

My U.S. Pat. No. 3,181,098 described and claims a water sensitive resistor for use in soil that consists of a thin circular layer of suitable, granular, water-absorbent, fill material that is compressed by a sheet metal electrode into firm contact through a screen electrode with a ceramic membrane. The liquid in the fill is in liquid molecular-diffusional contact with the soil solution through the membrane, which also transmits to the fill the matric suction of the liquid phase of the soil. The electrolytic resistance of this type of water-sensitive resistor has a stable responsive relation to the matric suction of the soil, at any given temperature and soil salinity condition. As the matric suction of the soil increases, the liquid content of the fill decreases and the electrolytic resistance of the fill between the electrodes increases. However, this resistance also increases if the temperature or salinity of the soil decreases. This negative response is a distinct disadvantage if an uncompensated water-sensitive resistor is used for controlling irrigation, either automatically or manually, because plants have less need for water if the soil temperature or salinity decrease. In other words, decreases of soil temperature or salinity actually lessen the need for irrigation, but produce the effect on the signal from an electrolytic-resistance type sensor of an increase of matric suction, which latter indicates an increased need for irrigation. For example, in the arid Southwestern United States, the coldest nights of winter often follow winter rains. These rains also leach salts from the surface of irrigated soil. On such nights, I have found that automatic sprinkler systems often commence irrigation and apply water to wet soil if the sensor for automatic control is an uncompensated water-sensitive resistor. In this example, salinity change is undoubtedly the major contributor to the negative signal from the sensor, but temperature reduction also contributes to the unwanted component of the signal.

SUMMARY OF THE INVENTION

My new and useful method for correcting water-sensitive resistors for undesirable temperature and salinity effects is based on the following facts and principles:

1— The liquid solution content of a thin layer of selected, water-absorbing fill material that is in hydraulic and molecular-diffusional equilibrium through a porous ceramic membrane with soil, depends on the matric suction of the soil and can be used to measure the matric suction of soil.

2 — The liquid content of said fill material can be appraised by measuring the a.c. electrical conductance or resistance across said fill by means of suitably installed electrodes and conventional instruments.

3 — For any given fill material in a given water-sensitive resistor at a given water content that is determined by the matric suction, the a.c. resistance of the fill depends primarily on the electrical conductance of the water films and hence on the electrical conductivity of the solution comprising the films.

4 — The unwanted effects of temperature and salinity on the a.c. resistance arise mostly from the effect of temperature and salinity on the electrical conductivity of the solution in the sensitive element and this relation over a useful range of the variables approximates a simple inverse proportion. For example, for a properly constructed water-sensitive resistor at constant matric suction, a 10 percent decrease in the electrical conductivity of the soil solution in the fill material, whether caused by temperature change or salinity change or both, causes a 10 percent increase in the a.c. resistance.

Practical application of the foregoing is made by using pairs of water-sensitive resistors which are connected in series and serve as one branch of a Wheatstone bridge. These resistors are constructed as hereinafter described, so their sensitivities to matric suction (i.e., their rates of change of a.c. resistance with respect to matric suction), differ as desired and can be made approximately constant over a useful range of matric suction. Two such resistors are disposed adjacently in soil so that the temperature, salinity and matric suction are the same for both. From the characteristics given in the foregoing paragraph it is evident that since the percent change in the a.c. resistances of the two are the same for temperature and salinity these two changes cancel each other when the ratio is considered. Thus the ratio of two such resistances, as measured by the Wheatstone bridge at balance, becomes a measure of matric suction alone. A quantitative formulation of this method of compensation is given hereinafter, along with measured characteristics of production models of temperature and salinity compensated water-sensitive resistors.

Figure 1:
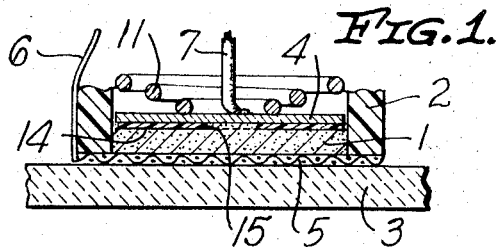
FIG. 1 is a sectional view showing the arrangement of the components of my water-sensitive resistor.

DESCRIPTION OF THE PREFERRED EMBODIMENT:

For a discussion of the principles of the invention and an analytical explanation of my method for temperature and salinity compensation, attention is first directed to FIGS. 1 to 6. FIG. 1 shows the essential parts of my water-sensitive resistor. A thin layer of granular, water-absorbent fill material 1 is contained laterally in a circular electrically-insulating cylinder 2 and is tightly clamped into contact with a ceramic membrane 3 by a spring-loaded sheet metal electrode 4, with a screen electrode 5 lying adjacent to the ceramic. The fill material 1 may be any granular, relatively insoluble, water-adsorbent mineral, such as high-purity quartz, for example. The screen with its electrical lead wire 6 is at earth potential. The compression electrode 4 and its insulated lead wire 7 are electrically insulated from ground except for current through the fill. The a.c. resistance of the fill, which is composed of mineral particles of low solubility, is determined largely by the amount of water in the fill and the electrical conductivity of this water. This conductivity in mhos per centimeter can be measured for bulk samples by conventional electrical conductivity cells and a.c. bridge methods.

Figure 2:
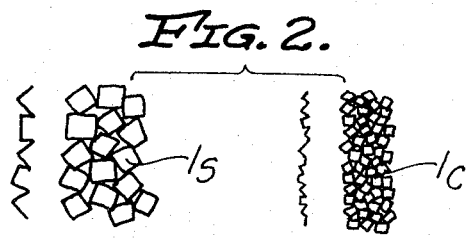
FIG. 2 is an enlarged representation of coarse and fine fill material to illustrate the effect of specific surface on water-content at constant film thickness (constant matric suction)

FIG. 2 is an enlarged, idealized section to illustrate the effect of particle size of fill on water content of fill material. The thickness of water film on the surface of the fill particles relates directly to matric suction. As the matric suction decreases the fill saturates, and conversely. At the same matric suction, the water content of the fill will be greater for fine fill, because of greater specific surface (surface area per unit mass of fill). This is illustrated by the relative blackness of the fine fill in FIG. 2 which is drawn to represent equal film thickness in the fine and the coarse material.

Figure 3:
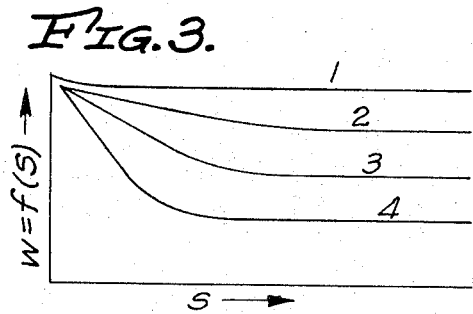
FIG. 3 is a family of curves indicating the functional relation of the relative water content w of the fill material to matric suction S as the particle size of fill is changed successively from fine (1) to coarse (4)

If the distance between electrodes is L, the area of the fill is A, and the volume of liquid water in the fill is $V_W$, then the bulk volume of fill is V=LA and the volume of water per unit bulk volume of fill is $w = V_W/V$. For properly graded fill materials, i.e., a gradation of particle sizes, the curves in FIG. 3 illustrate water retention curves attainable with various fills as the coarseness increases from Curves 1 to 4, over approximately the 15 bar suction range. These curves indicate a value of w for each of the fill materials illustrated for any selected value of matric suction. Let $w = f(S)$ represent this functional relation.

Let T represent the temperature in degrees centigrade and c the electrical conductivity of the solution in the fill. As a first approximation, assume this solution in the fill to be homogeneous. For an electrical current passing between the electrodes, the path length would be tortuous as illustrated by the crooked lines at the left of the fill materials represented in FIG. 2. The actual path length can be represented by $tL$ where t is a tortuosity factor somewhat greater than unity. For a homogeneous conductor of uniform cross-sectional area A, length L and conductivity c we can calculate conductance C and resistance R from the relation $C = 1/R = cA/L$. For our electrolytic resistor this becomes $1/R = cwA/tL$.

For the principal salts occurring in soil, the electrical conductivity c increases very nearly 2 percent per degree centigrade rise in temperature. Thus $c_T = c_{25}(1+0.02(T-25))$. Substituting this relation and the functional relation $w = f(S)$ and rearranging gives $R = tL/(Ac_{25}(1+0.02(T-25))f(S))$ for the relation between the a.c. resistance of a water-sensitive resistor and S, T, and $c_{25}$, the latter being the electrical conductivity in bulk of the equilibrium dialysate of the solution in the fill at the reference temperature of 25° centigrade.

Figure 4:
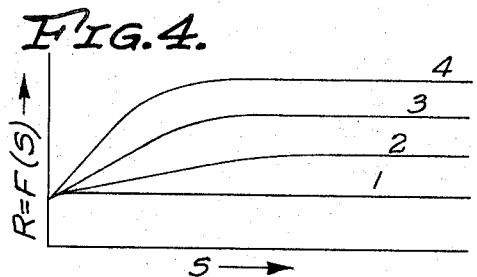
FIG. 4 shows the relation of a.c. resistance R to matric suction S for the particle sizes in FIG. 3, at constant temperature and salinity.

FIG. 3 gives representative experimental curves for $w = f(S)$ at constant T and c for four grades of coarseness of fill increasing from 1 to 4. FIG. 4 gives corresponding curves for $R = F(S)$ at constant T and c. A coarser fill gives a steeper slope at low suction. Fill 1 is so fine that for the suction range shown, change of both w and R with respect to matric suction is negligible.

Figure 5:
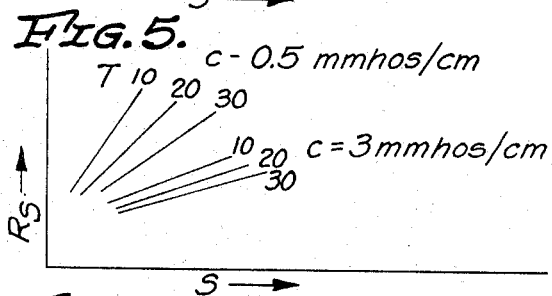
FIG. 5 shows representative curves for R (over the approximately linear initial portions of the curves in FIG. 4 at three temperatures T and two values C of electrical conductivity of solution.

The curves in FIG. 5 show the effect of temperature and salinity on the a.c. resistance $R_S$ of a single, selected, water-sensitive resistor that has a fill that is coarse enough to be responsive to S and with particle size gradation to have an initial linear relation to S. For the upper curve, steady equilibrium readings were taken at several S values with T = 10°C and c = 0.5 millimhos per centimeter. Readings were then repeated at the same salinity with T = 20°C and T = 30°C. The salinity was then changed to c = 3.0 millimhos per centimeter and the three adjacent curves were obtained at the three previously used T values.

Figure 6:
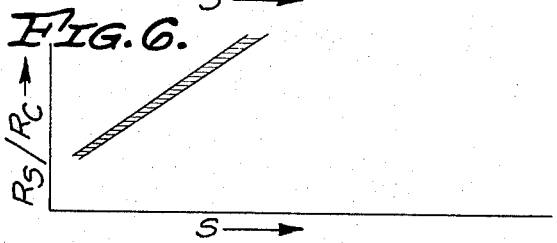
FIG. 6 shows that when the ratio of $R_S$ (for the initial parts of curves 2, 3, 4 of FIG. 4) to $R_C$ (curve 1, FIG. 4) is measured for the several temperature and conductivity values in FIG. 5, the ratio $R_S/R_C$ is found to be essentially invariant with respect to T and c over useful ranges of the variables.

If coincident with the foregoing resistance measurements, a.c. resistance values of a compensator resistor with fine fill (such as in 1 in FIGS. 3 and 4) are obtained and if values of the ratio $R_S/R_C$ are plotted as in FIG. 6, the ratio curves are found to lie within a narrow band, the spread of which approximates the error of measurement. Experimentally determined curves such as shown in FIG. 6 support the validity of the assumptions made above in developing the equations for R so that analytically $$\frac{R_S}{R_C} = \frac{\dfrac{tL}{Ac_{25}(1+0.02(T-25))f_S(S)}}{\dfrac{tL}{Ac_{25}(1+0.02(T-25))f_C(S)}}$$

Figure 8:
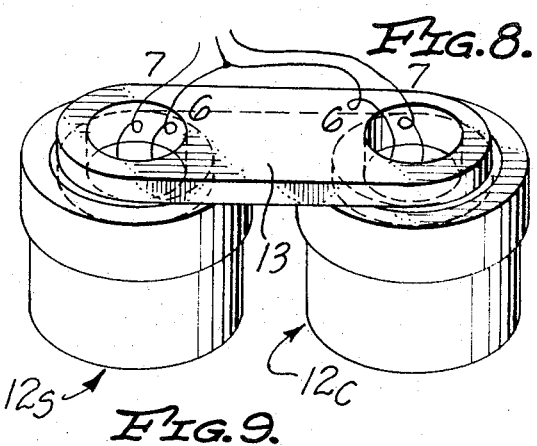
FIG. 8 is a perspective view of one embodiment of the invention, comprising an assembly of two resistors mounted side-by-side on a common support, one of said resistors having relatively coarse fill for sensitivity to matric suction, and the other having relatively fine fill for temperature and salinity compensation.

If the factors t, L and A of the two water-sensitive resistors are the same or are constant, and if the two resistors are adjacently exposed to soil so that T and c are the same for both, then all of the factors on the right reduce to a single constant multiplied by the ratio of the f functions for the compensator and the matric suction sensor, which are shown as $12_C$ and $12_S$, respectively, in FIG. 8.

Figure 7:
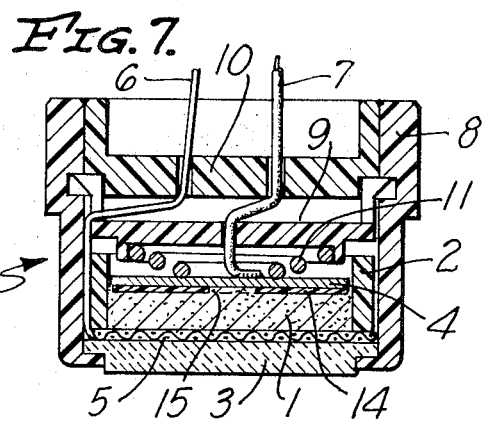
FIG. 7 is a cross-sectional view of a production model of my water-sensitive resistor.

The first embodiment of my invention is illustrated in FIGS. 7 and 8, to which attention is now directed. FIG. 7 shows one of the sensor units, which is designated in its entirety by the reference numeral 12, and in FIG. 8 the complete assembly is seen to comprise two sensors $12_S$ and $12_C$ that are mounted side-by-side on a molded plastic connector 13. Parts shown in FIGS. 7 and 8 which correspond functionally with their counterparts in FIG. 1, have the same reference numeral designations as in the latter. Parts 2, 8, 9 and 10 are of molded plastic. A bare metallic ribbon conductor 6 passes outwardly between the body 8 and lateral fill retainer 2. The compression electrode 4 is pressed tightly against the fill material 1 by spring 11. The assembly is completed by the solvent-welded cap 10, which provides a mechanical anchor for the lead wire.

The molded connector 13 is solvent-welded to part 10 (FIG. 7) to join the matric suction sensor $12_S$ and the compensator sensor $12_C$ into an integral pair for installation in soil. All constituent parts for $12_S$ and $12_C$ can be the same, and as shown in FIG. 7 except for fineness of fill. The lead wire 6 for the screen electrodes of the pair of resistors that together comprise a temperature and salinity compensated matric suction sensor are electrically connected near the units, thus reducing the lead-in cable to 3 conductors.

Figure 9:
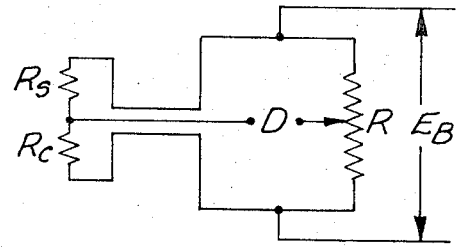
FIG. 9 shows a conventional Wheatstone bridge circuit for measuring the ratio $R_S/R_C$.

FIG. 9 shows a Wheatstone bridge circuit that is one commonly used device for measuring the ratio of the resistance of one resistor ($R_S$) due to matric suction, to that of the other ($R_C$). $R_S$ and $R_C$ represent a.c. resistance for remotely disposed water-sensitive resistors $12_S$ and $12_C$ (shown in FIG. 8). An a.c. voltage of the order of one to several volts is applied to the bridge at $E_B$. Frequencies in the range from 60 to 1,000 Hertz have been used. The unbalanced bridge voltage is detected at D. An adjustable potentiometer with dial calibrated to read ratio directly is shown at R. The curve of FIG. 6, representing the ratio $R_S/R_C$ for different values of S, was plotted from readings taken from the adjustable potentiometer R (FIG. 9) when the latter was adjusted to give minimum voltage at D for various values of S, T, a d c for the case where the fill material for both of the water-sensitive resistors was granular quartz of high purity. The particle size composition for the $12_S$ fill was: 1 part by volume of screen mesh 398 (openings per inch of standard screen) and 3 parts by volume of 50 mesh ground quartz. The fill for $12_C$ was colloidal quartz with specific surface of 325 square meters per gram. These fill materials gave the curve shown in FIG. 6. The measurements were taken with the circuit shown in FIG. 9.

The Wheatstone bridge balance is most sensitive for the equal arm condition of the bridge. For special applications it may be desirable to meet this condition at a given suction value. The compensator $12_C$ generally operates at higher water content than $12_S$ because of fineness of fill and would tend to have lower resistance, other parameters being equal. FIGS. 1 and 7 show a thin insulating washer 14 with a central hole 15 lying between the fill and the compression electrode. Adjusting the diameter of this hole allows easy control of the total resistance of the resistor without change of the proportional effect of temperature and salinity that is depended on for compensation. My method of temperature and salinity compensation does not require that properties represented by $tA/L$ for the two units be equal.

In the development of the above theory for my method of temperature and salinity compensation it was assumed that the electrical conductivity of the solution of the film phase in the fill was homogeneous. It is known that surface charge on various minerals produces a gradient in the ion concentration in the water film on the surface of the material, due to an electrical double layer and other effects. In such cases, I have found that graphs showing the relation between $R_S/R_C$ and S at various T and c values no longer coincide as shown in FIG. 6. Over or under compensation may occur. Certain clays for example, that are available commercially for the ceramic industry, when used for the fine fill in $12_C$ (with quartz in $12_S$) give over compensation.

Figure 10:
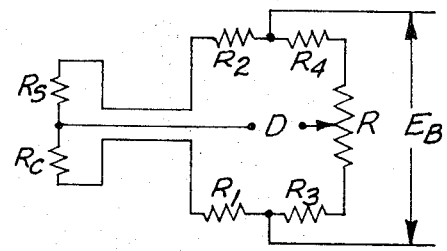
FIG. 10 is a Wheatstone bridge circuit showing added resistors for correcting over or under compensation for temperature and salinity and band spread resistors for adjusting the scale of the bridge balancing potentiometer.

FIG. 10 shows a Wheatstone bridge in which locations for added resistors are shown at $R_1$, $R_2$, $R_3$, and $R_4$. If for example the dependence of $R_C$ on temperature and salinity is too great and over compensation occurs, a resistor $R_1$ of appropriate size and negligible temperature coefficient can be inserted in the electrical circuit, which is usually remote from the soil sensor. The compensation arm of the bridge then becomes $R_C + R_1$, which has lower fractional dependence on soil temperature than $R_C$ alone. Conversely, if the salinity and temperature dependence of $R_C$ is too small, a resistor $R_2$ of appropriate size can be inserted to reduce in effect the temperature and salinity dependence of $R_S$.

In control circuits for automatic-irrigation control, it may often be desirable to use band spread resistors $R_3$ and $R_4$. For this application R becomes the moisture control dial and the operating point for the matric suction value (i.e., the ratio $R_S/R_C$) of principal interest in any given case can be brought to the center of the moisture control dial by appropriately choosing relative magnitudes of values of $R_3$ and $R_4$. The range of suction covered by the dial can also be selected by selection of the sum of $R_3$ and $R_4$.

Figure 13:
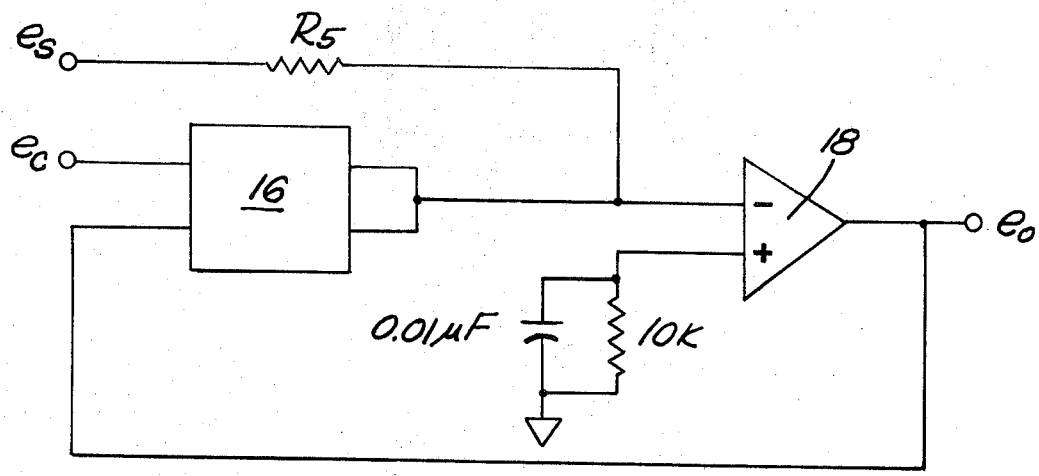
FIG. 13 is a schematic circuit diagram of another system for measuring the ratio $R_S/R_C$, using the operational amplifier instead of the Wheatstone bridge.

FIG. 13 shows the schematic circuit diagram of another system (in place of the Wheatstone bridge) for measuring the ratio of the resistance of resistor $R_S$ due to matric suction, to that of $R_C$, using operational amplifiers. The operational amplifier is an electronic amplifier that activates a passive network to form an active analog. Formerly, operational amplifiers were made with vacuum-tubes, but they are now almost entirely solid-state devices, usually in the form of integrated circuits. The circuit shown in FIG. 13 is what is known as a "quarter-square divider," and is shown in full detail on page 55 of "Applications Manual for Computing Amplifiers" (1966), published by Philbrick Researches, Inc., of Dedham, Massachusetts. $R_S$ and $R_C$ are measured by feeding a.c. voltages $e_s$ and $e_c$ into the circuit at the points shown. The voltages $e_s$ and $e_c$ (corresponding to $e_1$ and $e_2$, respectively, in the Philbrick citation) could be voltages generated by an a.c. current when $R_S$ and $R_C$ are connected in series.

In FIG. 13, the block designated by the reference numeral 16 represents a signal modifying network which might, typically, be a Q3–M1 multiplier-divider module manufactured and sold by Philbrick Researches, Inc. The circuit network 16 contains a number of operational amplifiers, as shown in the Philbrick citation, and its output is fed into a final summing operational amplifier 18. The output of amplifier 18 is connected back to one of the inputs of circuit 16, and input $e_s$ is fed directly into the summing point through a resistor $R_5$ of appropriate value for correct weighting. The output voltage of amplifier 18 is:

$$e_o = [20k/R_5][10v(e_s/e_c)]$$

This voltage can be fed into any read-out device calibrated in terms of matric suction.

Figure 11:
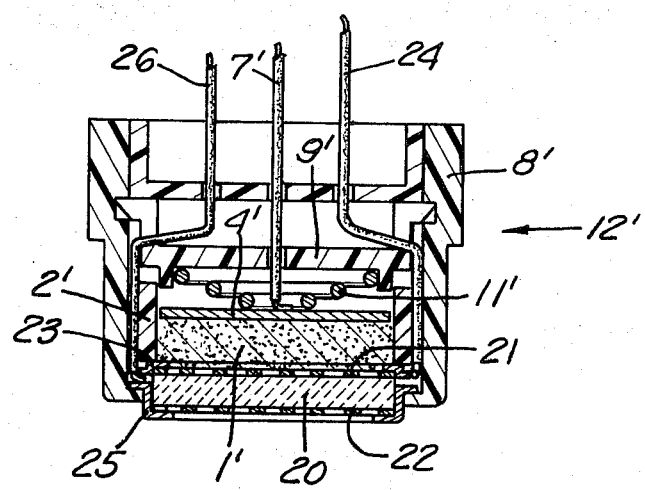
FIG. 11 is a sectional view, similar to FIG. 7, but showing another embodiment of the invention.
Figure 12:
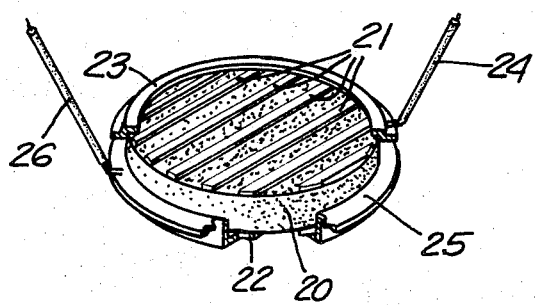
FIG. 12 is a partially cut-away perspective view of the ceramic disk forming a part of the device in FIG. 11.

Another embodiment of the invention is shown in FIGS. 11 and 12, to which attention is now directed. FIG. 11 is a view similar to FIG. 7, showing a compensated sensor 12' in which both the matric suction sensor and the temperature/salinity compensating element are combined in one unit. Those parts of FIG. 11 which are structurally identical (or similar) to their counterparts of FIG. 7, have the same reference numerals as in the latter, with the prime (') suffix. The primary difference between them is that the ceramic membrane 3 of FIG. 7 has been replaced in FIG. 11 with a fine-pored, porous ceramic disk 20 having parallel lines of adherent, sputtered metal film 21 and 22 deposited on opposite sides thereof, forming grid electrodes.

Surrounding the top edge of the disk 20 is a flanged collector ring 23, preferably stamped from sheet nickel or stainless steel, which fits tightly down over the edge of the disk and is electrically connected to grid electrode 21 with electrically conducting adhesive, such as epoxy containing colloidal silver. A lead-out wire 24 is spot welded to one point on ring 23 and passes up through the clearance between body members 8' and 2', and out through a hole in cap 10'.

A second annular collector ring 25 surrounds the bottom edge of disk 20, and is electrically connected to grid electrode 22 with conducting adhesive. A second lead-out wire 26 is spot welded to the flange of ring 25 and passes up through the clearance between body members 2' and 8', and out through another opening in cap 10'.

Packed down on the top surface of disk 20 and in intimate contact with grid electrode 21 is an absorbent fill of granular material 1'. The granular fill 1' is compressed by a spring 11' pressing downwardly against a metal disk electrode 4'. Spot welded to the top surface of electrode 4' and passing upwardly through holes in members 9' and 10' is a third lead-out wire 7'. Lead-out wires 7', 24 and 26 are connected to the resistance ratio measuring means, and the finely pored ceramic disk 20 serves as the temperature and salinity compensating unit, while the absorbent fill of granular material 1' serves as the matric suction sensor; the granular fill material 1' having much larger and coarser pores than the ceramic disk 20.

It is seen from the foregoing description that the sensor element made of a finely pored ceramic plate with a spaced grid of metallic film electrodes on both sides is functionally equivalent to the electrolytic resistance $R_C$ of a layer of finely divided particles clamped between a screen and a plate electrode. Both respond to the effect of salinity and temperature on the conductivity of the soil solution but have low response to matric suction. The ceramic plate sensor element, however, can be combined with obvious practical advantages, into a single envelope with a matric suction sensitive element to give a temperature and salinity compensated matric suction sensor.

While I have shown and described a preferred embodiment of my invention utilizing a differential change of a.c. resistance with matric suction, it is understood that the simplified circuit and analysis given apply precisely only when the phase angle between current and voltage for $R_S$ and $R_C$ are identical. However, for many practical applications, utilizing the construction and fill material here disclosed, discrepancies in the analysis and the performance of the sensor are negligible when the simplified resistance balance is used. For some fill materials, improved operation is given by connecting a fixed capacitance of the order of several tenths of a microfarad in parallel with $R_S$ when a variable resistance (potentiometer) is used for bridge balance. Furthermore, for some matric suction measurements, it may be advantageous to calibrate the compensated sensor in terms of either a capacitance or an impedance ratio instead of $R_S/R_C$. Electric circuit modifications for measuring these ratios are well known and are not here described.

In the foregoing description, specific structures and properties were used or cited as examples. However, the invention is not limited to such specific details. For example, in the water-sensitive resistors shown in FIGS. 2 and 7, the screen electrode 5 and ceramic plate 3 can both be replaced by a suitable disk of corrosion resistant porous metal, such as stainless steel, nickel or titanium. Other changes and modifications will occur to those skilled in the art.

I claim:

1. Apparatus for measuring the matric suction of soil, free from adverse effects due to changes in the salinity and temperature of the soil, said apparatus comprising:

a first water-sensitive resistor and a second water-sensitive resistor disposed closely adjacent one another in the soil, where they are similarly exposed to matric suction, salinity and temperature of the soil;

each of said resistors comprising a compact, porous body of material that is wettable by the soil solution, said body being in close liquid-phase transfer relation to the soil solution and having the property of absorbing solution and attaining molecular diffusional equilibrium therewith; and each of said porous bodies having electrodes spaced apart from one another;

one of said porous bodies having a relatively coarse pore size distribution, causing it to have a relatively large fractional change in resistance for an incremental change in matric suction, and the other porous body having relatively fine pore size distribution, causing it to have a relatively small fractional change in resistance for an incremental change in matric suction;

both of said porous bodies having substantially the same fractional change of resistance for incremental changes in salinity and temperature of the soil solution; and circuit means connected to said resistors for measuring the ratio of resistance of said resistors as effected by matric suction, said circuit means providing a ratio measurement read-out that is a function of matric suction compensated for the effects of temperature and salinity.

2. Apparatus as in claim 1, wherein each of said resistors has a membrane that is permeable to soil solution, one side of said membrane being disposed in intimate contact with the soil; and each of the bodies of porous material comprising a quantity of relatively insoluble granular fill material that is wettable by the soil solution and in close liquid-phase transfer relation to the other side of said membrane; said fill material having the property of absorbing solution and attaining molecular-diffusional equilibrium with soil solution through said membrane;

the granular fill material of one of said water-sensitive resistors being of a different particle size than the granular fill material of the other resistor, and the fractional change in resistance for an incremental change in matric suction being relatively greater in one of said resistors than in the other due to differences in particle size; and a pair of electrodes supplying steady compressive stress against opposite sides of said fill material in each resistor.

3. Apparatus as in claim 2, additionaly including a thin, perforated barrier of electrically insulating material disposed between said granular fill and the electrode on the opposite side of said fill from said membrane, for the purpose of increasing the resistance range of said water-sensitive resistor.

4. Apparatus as in claim 1, wherein said two resistors are contained within a single housing; one of said resistors comprising a first fine-pored porous body having a pair of electrode means on opposite sides thereof, one side of said body being disposed in intimate contact with the soil; and the other resistor comprising a second porous body having one side in intimate contact with the one of said electrode means on the other side of said first body; said second body having a different porosity than said first body, with a correspondingly different response characteristic to changes in matric suction; and another electrode on the other side of said second body; said circuit means being connected to said electrodes.

5. Apparatus as in claim 4, wherein said first resistor comprises a fine-pored, porous ceramic disk having a pair of electrode means on opposite sides thereof, one side of said disk being disposed in intimate contact with the soil; and said other resistor comprising a quantity of relatively insoluble granular fill material that is wettable by the soil solution, said fill material being packed firmly against the other side of said disk and in intimate contact with the one of said electrode means on that side of the disk; and said other electrode on the other side of said fill material exerting steady compressive stress against the latter.

* * * * *